United States Patent
Kobayashi et al.

(10) Patent No.: US 12,260,306 B2
(45) Date of Patent: Mar. 25, 2025

(54) TEXTUAL EXPLANATIONS FOR ABSTRACT SYNTAX TREES WITH SCORED NODES

(71) Applicant: Oracle International Corporation, Redwood Shores, CA (US)

(72) Inventors: Kenyu Kobayashi, Lausanne (CH); Arno Schneuwly, Effretikon (CH); Renata Khasanova, Zurich (CH); Matteo Casserini, Zurich (CH); Felix Schmidt, Baden-Dattwil (CH)

(73) Assignee: Oracle International Corporation, Redwood Shores, CA (US)

( * ) Notice: Subject to any disclaimer, the term of this patent is extended or adjusted under 35 U.S.C. 154(b) by 323 days.

(21) Appl. No.: 17/891,350

(22) Filed: Aug. 19, 2022

(65) Prior Publication Data

US 2024/0061997 A1 Feb. 22, 2024

(51) Int. Cl.
*G06F 8/41* (2018.01)
*G06N 20/00* (2019.01)

(52) U.S. Cl.
CPC .................... *G06N 20/00* (2019.01)

(58) Field of Classification Search
CPC ........ G06N 20/00; G06N 5/045; G06F 8/427; G06F 16/2452; G06F 21/563; G06F 40/44; G06F 40/56
See application file for complete search history.

(56) References Cited

U.S. PATENT DOCUMENTS

| | | | |
|---|---|---|---|
| 8,341,096 B2* | 12/2012 | Fisher | G06F 16/90344 707/708 |
| 2015/0046492 A1* | 2/2015 | Balachandran | G06F 8/36 707/772 |
| 2015/0222730 A1* | 8/2015 | Gower | H04L 67/01 709/203 |
| 2015/0248462 A1* | 9/2015 | Theeten | G06F 16/24524 707/688 |
| 2016/0110421 A1* | 4/2016 | Gallé | G06F 16/25 707/769 |
| 2018/0096144 A1 | 4/2018 | Pan | |
| 2019/0188212 A1 | 6/2019 | Miller | |

(Continued)

OTHER PUBLICATIONS

Kandanaarachchi et al., "On normalization and algorithm selection for unsupervised outlier detection", Data Mining and Knowledge Discovery, vol. 34, Mar. 2020, pp. 309-354.

(Continued)

*Primary Examiner* — Daxin Wu
(74) *Attorney, Agent, or Firm* — Hickman Becker Bingham Ledesma LLP; Brian Miller

(57) ABSTRACT

Herein is a machine learning (ML) explainability (MLX) approach in which a natural language explanation is generated based on analysis of a parse tree such as for a suspicious database query or web browser JavaScript. In an embodiment, a computer selects, based on a respective relevance score for each non-leaf node in a parse tree of a statement, a relevant subset of non-leaf nodes. The non-leaf nodes are grouped in the parse tree into groups that represent respective portions of the statement. Based on a relevant subset of the groups that contain at least one non-leaf node in the relevant subset of non-leaf nodes, a natural language explanation of why the statement is anomalous is generated.

18 Claims, 10 Drawing Sheets

701 Based on respective relevance score for each non-leaf node in parse tree of statement, select relevant subset of non-leaf nodes 702 Group non-leaf nodes in parse tree into groups that represent respective portions of statement 703 Replace each group of relevant subset of groups with group node 704 Retain only group nodes 705 Based on relevant subset of groups that contain at least one non-leaf node in relevant subset of non-leaf nodes, generate explanation of why statement is anomalous

(56) References Cited

U.S. PATENT DOCUMENTS

2021/0365456 A1* 11/2021 Kondiles ............... G06F 16/248
2022/0198294 A1 6/2022 Schneuwly et al.

OTHER PUBLICATIONS

Apel et al., "Learning SQL for Database Intrusion Detection using Context-sensitive Modelling", dated 2009, 33 pages.
Baldassarre et al., "Explainability Techniques for Graph Convolutional Networks", dated May 2019, 21 pages.
Bockermann et al., "Learning SQL for Database Intrusion Detection Using Context-Sensitive Modelling", DIMVA dated 2009, LNCS 5587, 10 pages.
Cai et al., "An Abstract Syntax Tree Encoding Method for Cross-Project Defect Prediction", IEEE, dated Nov. 15, 2019, 10 pages.
Chomsky, "Three Models for the Description of Language," in IRE Transactions on Information Theory, vol. 2, No. 3, Sep. 1956, 12 pages.
Follenfant et al., "SQL Abstract Syntax Trees Vocabulary", available: https://ns.inria.fr/ast/sql/index.html, Jan. 2014, 26 pages.
Alon et al., "A General Path-Based Representation for Predicting Program Properties" dated Apr. 22, 2018, 16 pages.
Jimenez et al., "On the Impact of Tokenizer and Parameters on N-Gram Based Code Analysis", dated 2018, 12 pages.
Zhang et al., "A Novel Neural Source Code Representation based on Abstract Syntax Tree", 2019 IEEE/ACM 41st International Conference on Software Engineering (ICSE), 2019, 12 pages.
Linardatos et al., "Explainable AI: A Review of Machine Learning Interpretability Methods", Entropy, vol. 23, No. 1, 2021, 45 pages.
Mou et al., "Building Program Vector Representations for Deep Learning", dated Sep. 11, 2014, 11 pages.
Ndichu et al., "A machine learning approach to detection of JavaScript-based attacks using AST features and paragraph vectors", Applied Soft Computing 84, 2019, 11 pages.
Rabinovich et al., "Abstract Syntax Networks for Code Generation and Semantic Parsing", dated 2017, 11 pages.
Sharma et al., "A Survey on Machine Learning Techniques for Source Code Analysis", dated 2021, 59 pages.
Widenius et al., "MySQL Reference Manual", Chapter 6, Jan. 2002, 98 pages.
Yamaguchi et al., "Generalized Vulnerability Extrapolation using Abstract Syntax Trees", ACSAC '12 Dec. 3-7, 2012, Orlando, Florida USA, 10 pages.
Harshvardhan et al., "A Comprehensive Survey and Analysis of Generative Models in Machine Learning", Computer Science Review, vol. 38, 2020, 48 pages.

* cited by examiner

TEXTUAL EXPLANATIONS FOR ABSTRACT SYNTAX TREES WITH SCORED NODES

FIELD OF THE INVENTION

The present invention relates to machine learning (ML) explainability (MLX). Herein a natural language explanation is generated based on analysis of a parse tree such as for a suspicious database query.

BACKGROUND

In computer science, an abstract syntax tree (AST) is a representation of the syntactic structure of source code written in a formal language. An AST is a logical graph in which each node represents a syntactic construct occurring in the source code. ASTs are widely used for source code representation in various programmatic use cases. A formal language is characterized by a formal grammar that defines a set of terminal and nonterminal symbols. ASTs are composed of leaf nodes representing tokens (i.e. terminal symbols) in the source code and non-leaf nodes representing nonterminal symbols.

A nonterminal symbol produces one to multiple nonterminal or terminal symbols, by following the set of syntactic rules dictated by the programming language's formal grammar. These rules are referred to as production rules, which define the syntax of the language. Production rules express which combinations of nonterminal and terminal symbols are syntacticly valid. A parser for a specific grammar strictly follows these rules to generate an AST for a given token sequence.

Machine learning (ML) for source code has received increased interest in recent years. One major technical problem is how to effectively represent a code snippet as a feature vector. Recent research has shown that training an ML model with features based on ASTs provides more accurate model inferences.

A realistic AST may have hundreds of nodes, such as for automatically generated online analytic processing (OLAP) queries. Likewise, internals of an ML model may be unintelligibly complex. For example in year 2021, the largest artificial neural network had half a trillion connection weights. Thus, exhaustively explaining why an ML model generated a particular model inference for a particular input may be more or less intractable.

Various forms of ML explainability (MLX) can automatically provide the following functionalities:
Explainability: The ability to explain why a particular inference occurred,
Interpretability: The level at which a human can understand the explanation, and
What-If Explanations: Understand how incremental changes in input may or may not change the inference.

For example, an explanation may be needed for regulatory compliance. Likewise, the explanation may reveal an edge case that causes the ML model to malfunction for which retraining with different data or a different hyperparameters configuration is needed.

For a realistic and huge AST, only a small fraction of its nodes may significantly contribute to the model inference. Excessive computer resources (e.g. time and space) for generating an explanation (and mental resources for understanding the explanation) of a model inference may be wasted processing irrelevant nodes.

DETAILED DESCRIPTION

Figure 1:
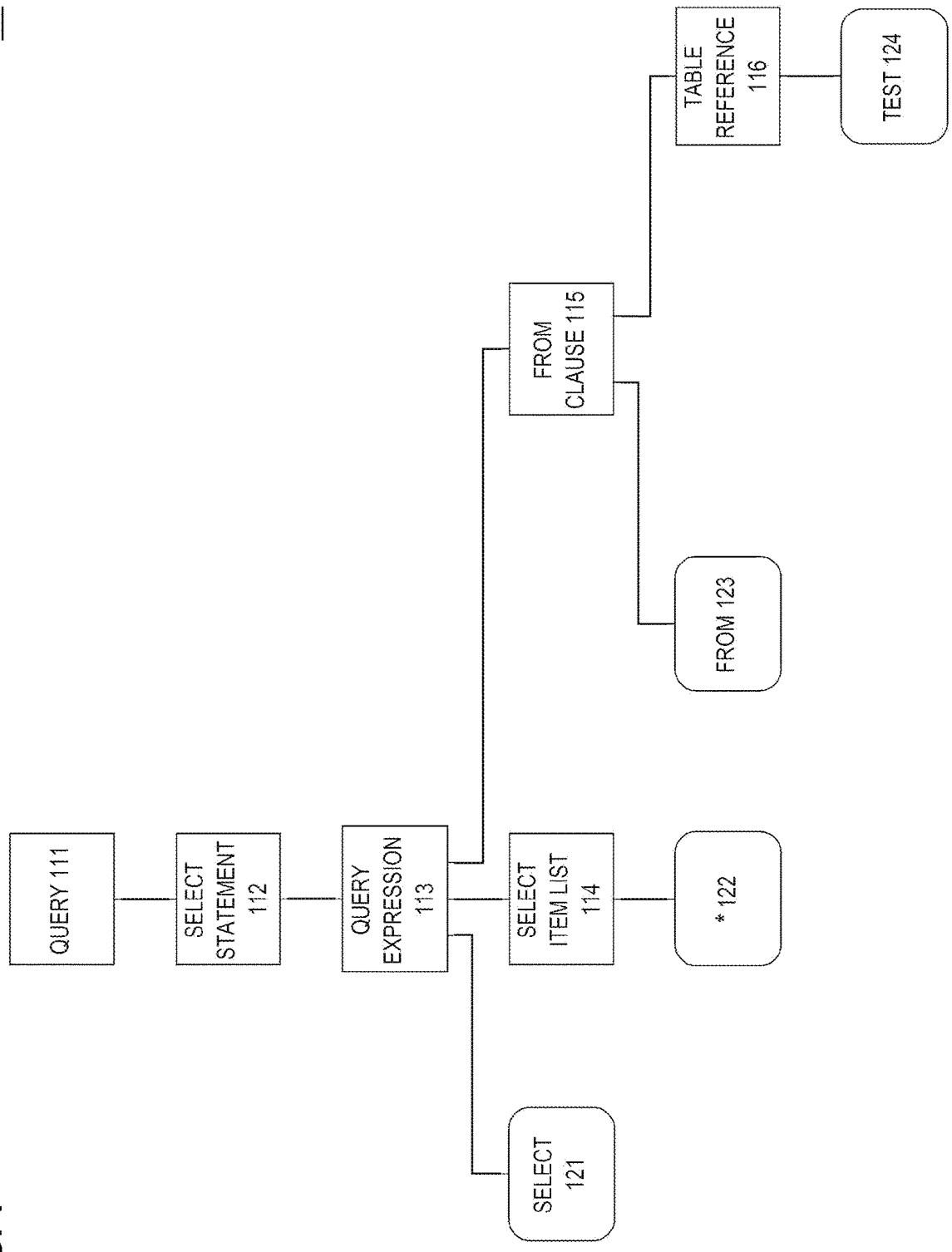
FIG. 1 is a block diagram that depicts an example parse tree that a computer may generate and analyze.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is a machine learning (ML) explainability (MLX) approach in which a natural language explanation is generated based on analysis of a parse tree with scored nodes such as for a suspicious database query or JavaScript. By analyzing relevance scores assigned to individual nodes in an abstract syntax tree (AST) of source code, explanatory insights may be provided to a user. Relevance scores of non-leaf nodes in an AST are propagated to the leaves of the AST (e.g. tokens from a query), and those leaves may provide comprehensible text to include in a natural language explanation.

In various embodiments, statement(s) or a code snippet is translated to an AST that provides feature input to an ML model that detects anomalous inputs. For generating an attribution-based explanation on the ML model's prediction, relevance scores are assigned to nodes in the AST, reflecting their influence on the ML model's inference. As the size of an AST grows larger with the length of the represented code snippet, manual extraction of insights from the scoring scheme becomes unmanageable. The framework herein leverages relevance scores and the syntactic structure of ASTs to produce insightful natural language explanations that are concise and user-friendly.

Extracting insights becomes cumbersome when the query and AST become large. Because user-friendliness is a key property in the field of explainability (notably when applied to security-related areas such as database intrusion detection where a defensive response should rapidly occur), MLX herein provides a new layer of generalization to increase agility. However, the following technical challenges need to be addressed in order to generate such explanations.

A textual explanation should only mention nodes with a relatively high relevance score. For this purpose, a relevance threshold should be set, above which nodes are considered relevant to the explanation. Because the distribution of relevance scores varies from one AST to another, a generalized strategy is provided.

Textual explanations need to be concise. Some nodes in an AST belong to a same syntactic group in the source code. In the explanation, syntactically related nodes should be referred to as a syntactic group. Summarization of nodes into a single syntactic group is not trivial because the structure of the AST needs to be taken into account.

Textual explanations should not be ambiguous. To avoid ambiguity and readily identify the parts of the source code that the explanation refers to, the approach herein contextualizes syntactic groups when mentioning them in the explanation. However, automating the selection of a contextualizing syntactic group is not trivial.

Textual explanations generated by this framework have enhanced user-friendliness. Prior works do not propose solutions for the above enumerated specific problems. This framework generates textual explanations in two stages. First, a novel graph of relevant syntactic groups is generated from a given AST. Second, textual explanations are generated by analyzing that graph in novel ways.

To produce a textual explanation of an AST with scored nodes, this approach identifies relevant parts and summarizes them into a simplified graph that is referred to herein as a group graph or a graph of relevant syntactic groups. The extraction of such a graph from an AST entails at least the following preparatory analytic steps:
1. Choose the relevant nonterminal symbols for the explanation;
2. Classify all nonterminal symbols into classes;
3. Cluster all nonterminal symbols into syntactic groups;
4. Prune irrelevant syntactic groups.

The group graph is a directed acyclic graph (DAG) with potentially several components that are not connected to each other. Each branch within a given component is composed of one or several relevant syntactic groups from the source code, and those groups are logically linked in a hierarchical manner. Each syntactic group belongs to a class as discussed herein. This approach generates a textual explanation through the following explanation generation steps:
1. Identify the component(s) in the group graph;
2. For each component, identify the branch(es);
3. For each branch, generate a respective natural language sentence for the textual explanation.

This approach has various novel aspects such as follows. The framework generates rule-based textual explanations for source code. Given an AST with scored nodes which highlights the relevant parts of a code snippet, the framework collects and summarizes the main explanatory insights by leveraging the scores and the syntactic structure of the AST. This is achieved by the above novel preparatory analytic steps and explanation generation steps. The result is explanations that are less ambiguous and more user-friendly than the state of the art. Techniques herein are computationally efficient. For example, the solution does not require training a generative ML model as with the state of the art.

In an embodiment, a computer selects, based on a respective relevance score for each non-leaf node in a parse tree of a statement, a relevant subset of non-leaf nodes. The non-leaf nodes are grouped in the parse tree into syntactic groups that represent respective portions of the statement. Based on a relevant subset of the groups that contain at least one non-leaf node in the relevant subset of non-leaf nodes, a natural language explanation of why the statement is anomalous is generated.

1.0 First Example Parse Tree

FIG. 1 is a block diagram that depicts an example parse tree 100 that a computer (e.g. computer 300 in FIG. 3) may generate and analyze, in an embodiment. Parse tree 100 is a hierarchical data structure. Structured content such as text are represented by parse tree 100 that may be a parse tree or an abstract syntax tree (AST). In an embodiment, parse tree 100 represents one or more logic statements such as a database query such as structured query language (SQL) or statement(s) in a programing language such as a code source language such as a scripting language. In an embodiment, parse tree 100 instead represents a hierarchical document such as a document object model (DOM) for extensible markup language (XML) or JavaScript object notation (JSON).

Parse tree 100 consists of hierarchically connected tree nodes such as nodes 111-116 and 121-124. Trees, subtrees, and tree nodes are data structures stored in memory. A parent node may be connected to a child node by a referential link, such as a memory address pointer or array index, that may be stored in the parent node and/or child node and refers to the other node. Tree traversal may entail dereferencing such links between nodes. Tree traversal may occur in an enumeration ordering such as preorder, in order, or post order visitation of a parent node and child nodes. Regardless of ordering, tree traversal may be based on recursion, iteration, and/or queueing.

Tree nodes need not be contiguously stored in memory. Tree nodes may be dynamically allocated in memory. Subtrees are composable. For example, adding a subtree to a tree may entail linking the root node of the subtree, as a child node, to a parent node already in the tree. A tree node may contain or otherwise be associated with data fields that, by inspection, may facilitate analysis of tree nodes or tree paths such as discussed later herein.

1.1 Production Rules

Herein, a formal grammar defining a programming language is a collection of syntactic instructions that specifies how statements should be written to be compatible with the language. The instructions are presented in the form of production rules that specify the order in which characters and symbols (e.g. text strings such as an identifier, keyword, or literal), should sequentially occur to form valid statements.

The production rules defining the grammar specify which symbols may replace other symbols during parsing. $\Sigma$ is a set of terminal symbols representing actual strings that may be produced by the production rules. A terminal symbol should not be replaced during parsing. Nonterminal symbols may be replaced with other symbols during parsing. Because a nonterminal symbol may be replaced with one of multiple alternative symbols or replaced with a sequence of multiple symbols, nonterminal symbols operate as syntactic variables introduced to provide generalization and structure in productions. A production is an application of a production rule to cause replacement of a nonterminal symbol.

A programming language's syntax is described by a context-free grammar, whose production rules have the following form.

<symbol>→expression

Above, <symbol> is a single nonterminal symbol, and expression consists of one or more alternative sequences of terminal and/or nonterminal symbols. The notation→indicates that the symbol on the left should be replaced with the expression on the right. Techniques using productions, production rules, and terminal and nonterminal symbols for generating tree nodes of a parse tree or an abstract syntax tree that conforms to a context free grammar are presented in related non-patent literature "Semantics of context-free languages" by Donald Knuth in *Mathematical systems theory* 2, no. 2 (1968): 127-145, which is incorporated herein by reference in its entirety.

Given textual source code, a parser produces a sequence of tokens during tokenization. By applying production rules given by a formal grammar, the sequence of tokens (i.e. terminal symbols) is translated to generate parse tree 100 during parsing. For example, parsing the structured query language (SQL) statement "SELECT*FROM TEST" generates a sequence of terminal symbols that are shown as leaf nodes 121-124 that are drawn with rounded rectangles in parse tree 100. Each of leaf nodes 121-124 shows the corresponding actual text that occurs in the SQL statement. Parsing applies SQL grammar production rules that specify nonterminal symbols for respective non-leaf nodes 111-116. Each of non-leaf nodes 111-116 shows the name of the corresponding nonterminal symbol, which is not text that occurs in the SQL statement.

As discussed later herein, parse tree 100 and its composition and arrangement of nodes 111-116 and 121-124 may be analyzed to detect that the SQL statement is anomalous even though the SQL statement is syntactically and/or semantically valid. Presented later herein are MLX techniques for analysis of parse tree 100 and its composition and arrangement of nodes 111-116 and 121-124 to generate an explanation of why the SQL statement is anomalous.

1.2 Anomaly Detector

In an embodiment, computer 100 or a different computer hosts in memory and operates an anomaly detector that may or may not have an unknown, opaque (i.e. black box), or confusing architecture that more or less precludes direct inspection and interpretation of the internal operation of the anomaly detector. In various embodiments, the anomaly detector is or is not a machine learning (ML) model, which is already trained.

Functionally, the anomaly detector is a numeric regression that generates or infers a numeric anomaly score that measures how unfamiliar, abnormal, or suspicious is parse tree 100 or the corresponding SQL statement. In various embodiments, the anomaly detector does or does not operate based on parse tree 100, which is a particular representation of the SQL statement.

In various embodiments, the anomaly score is or is not a probability that the statement is anomalous. A numeric anomaly score may be compared to a predefined anomaly threshold to detect whether or not the statement is anomalous. Generally, an anomalous statement should have a higher anomaly score than a non-anomalous statement.

2.0 Second Example Parse Tree

Figure 2:
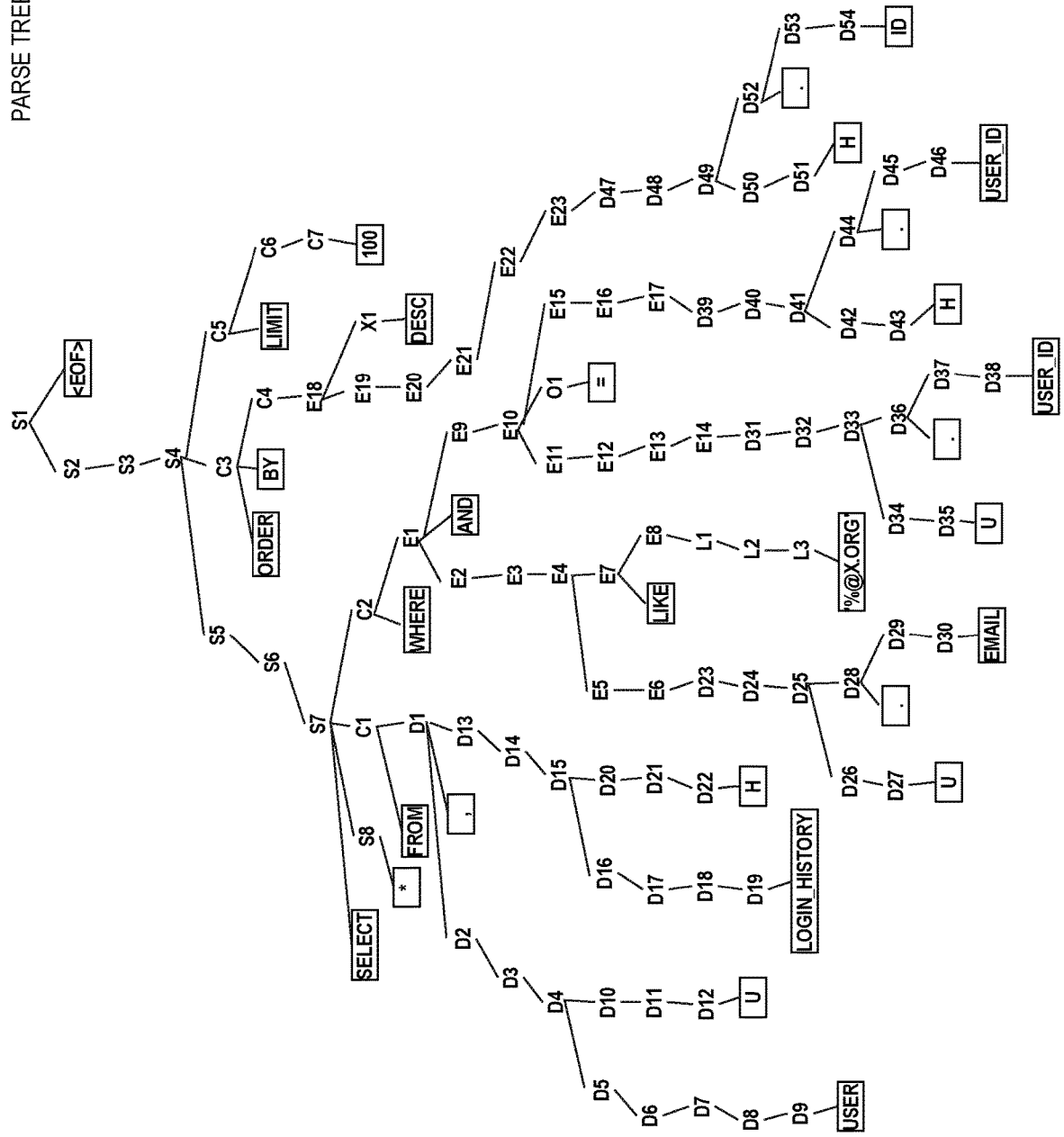
FIG. 2 is a block diagram that depicts an example parse tree that a computer may generate and analyze.

FIG. 2 is a block diagram that depicts an example parse tree 200 that a computer (e.g. computer 300 in FIG. 3) may generate and analyze, in an embodiment. Parse tree 200 is generated from the SQL statement "SELECT * FROM USER U, LOGIN_HISTORY H WHERE U.EMAIL LIKE '%@X.org' AND U.USER_ID=H.USER_ID ORDER BY H.ID DESC LIMIT 100". Leaf nodes are shown in respective rectangles with corresponding actual text from the SQL statement. Leaf node <EOF> terminates the SQL statement such as per an end of file (EOF).

Unlike FIG. 1, non-leaf nodes in FIG. 2 show respective unique identifiers (e.g. S1) that are not names of nonterminal symbols. For example, non-leaf nodes E1-E2 and E9 are different nodes with respective (e.g. nested) instances of a same nonterminal symbol. Nesting occurs when a production rule of a nonterminal symbol has a recursive expression that also contains the nonterminal symbol. Repetition of a nonterminal symbol also occurs when an expression of a production rule contains multiple instances of that nonterminal symbol. The following Table 1 classifies the non-leaf nodes of parse tree 200 into the following classes.

| Non-leaf nodes | Class |
|---|---|
| S1-S8 | Statement |
| C1-C7 | Clause |
| D1-D54 | Catalog object |
| E1-E23 | Expression |
| O1 | Operator |
| X1 | Other |

A (e.g. SQL) statement is composed of logical portions (e.g. clauses) that each have a respective semantic functionality. A class is a set of nonterminal symbols that could occur in a functional portion such as a clause. Nonterminal symbols in a same class have similar, complementary, or overlapping semantics. Classes are distinct according to separation of concerns in a language. For example, the catalog object class represents details of a database schema or database dictionary such as a relational table name or a modifier of a table column, whereas the expression class does not regard a database schema.

Non-leaf nodes E18 and E21 correspond to respective nonterminal symbols named orderExpression and predicate that collaboratively contribute to defining a SQL expression that occurs in the SQL statement. The orderExpression and predicate nonterminal symbols are in the expression class, which is why non-leaf nodes E18 and E21 are shown in the same class in above Table 1.

Each class contains one or more nonterminal symbols. A nonterminal symbol has exactly one class. Formulation of classes may be automatic or manual. For example, a computer scientist may decide how many classes and which nonterminal symbols are in which classes. In an embodiment, a parser provides predefined object-oriented classes that each corresponds to a respective distinct nonterminal symbol. The object-oriented classes may already be arranged in a predefined inheritance hierarchy that corresponds to nesting of production rules in the grammar.

Herein, a class is not the individual object-oriented class. Instead, a class may be a set of object-oriented classes that are near each other in the class hierarchy. Each class represents a disjoint (i.e. non-overlapping) portion of the class hierarchy. For example, the orderExpression and predicate nonterminal symbols may correspond to object-oriented classes that derive (i.e. inherit) from a same base class (i.e. ancestor in the class hierarchy) that represents the expression class. In an embodiment, each class corresponds to exactly one distinct base class in the class hierarchy. Analysis based on classes is discussed later herein.

3.0 Example Computer

Figure 3:
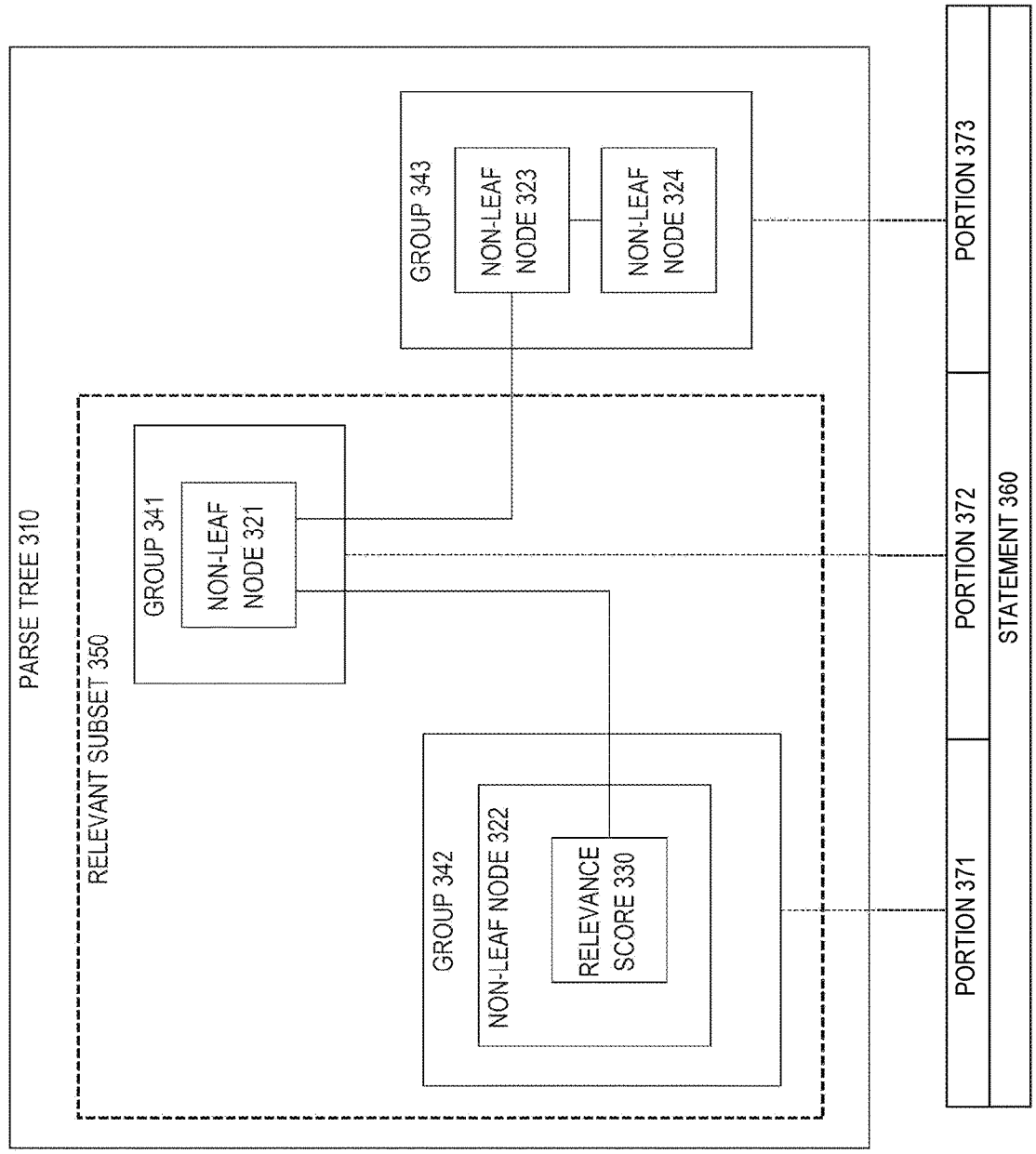
FIG. 3 is a block diagram that depicts an example computer that uses machine learning (ML) explainability (MLX) and analysis of a parse tree to generate a natural language explanation of why a statement is anomalous.

FIG. 3 is a block diagram that depicts an example computer 300, in an embodiment. Computer 300 uses machine learning (ML) explainability (MLX) and analysis of parse tree 310 (or 100 or 200) to generate a natural language explanation of why statement 360 is anomalous. Computer 300 may be one or more of a rack server such as a blade, a personal computer, a mainframe, a virtual computer, or other computing device. FIG. 3 is discussed with reference to FIG. 2.

Computer 300 receives and parses statement 360 to generate parse tree 310 that contains non-leaf nodes 321-324. Although not shown, parse tree 310 also contains leaf nodes.

3.1 Machine Learning Explainability (MLX)

As discussed later herein, computer 300 may generate an explanation as to why an anomaly detector inferred a particular anomaly score for statement 360. For example in various scenarios, statement 360, its anomaly score, and/or the anomaly detector are reviewed for various reasons. ML explainability (MLX) herein can provide combinations of any of the following functionalities:

Explainability: The ability to explain why a given anomaly score occurred for statement 360

Interpretability: The level at which a human can understand the explanation What-If Explanations: Understand how changes in statement 360 may or may not change the anomaly score and/or change statement 360 from anomalous to non-anomalous.

For example, the explanation may be needed for regulatory compliance. Likewise, the explanation may reveal an edge case that causes the anomaly detector to malfunction for which retraining with different data or a different hyperparameters configuration is needed.

3.2 Relevance Scores

State of the art attribution based explanation (ABX) is MLX with traceability to features of a feature vector that caused an ML model to generate a particular inference. For example, the inference may be that statement 360 or parse tree 310 is anomalous or has an inferred anomaly score (that exceeds a predefined threshold). ABX detects (e.g. quantifies or ranks) how much each feature contributed to the inference.

Herein, ABX instead generates a respective relevance score for each tree node in parse tree 310 that measures how much did the node contribute to the inference that parse tree 310 is anomalous or contribute to the inferred anomaly score for parse tree 310. Herein, a feature vector is not required to separately represent each tree node in parse tree 310, and there need not be a one-to-one correspondence between tree nodes and features.

In any case, relevance score 330 may quantify that non-leaf node 322 is a sole or partial cause of the anomaly or not a cause of the anomaly. Although not shown, every leaf node and non-leaf node in parse tree 310 may have a respective relevance score. In various embodiments, the relevance scores of nodes in parse tree 310 do or do not sum to a predefined whole such as one or 100%.

A (e.g. parse) tree is an example of a directed acyclic graph (DAG) in which each tree node effectively is a distinct graph vertex. Example techniques for generating respective MLX relevance scores for vertices of a graph are presented in non-patent literature "Graph-based Anomaly Detection and Description: A Survey" by Leman Akoglu et al published in Data Mining And Knowledge Discovery in year 2015 that is incorporated herein in its entirety. Akoglu (section 3.3) warns, "graph kernels cannot do attribution".

Non-leaf nodes 323-324 in same group 343 may have different respective relevance scores. A parent node may have a relevance score that is more than or less than the relevance score of a child node.

In an embodiment, relevance scores are normalized such as with the following example normalization formula.

$$\frac{s(v) - \min(S)}{\max(S) - \min(S)}$$

The following terms have the following meanings in the above example normalization formula.

v is one of non-leaf nodes 321-324.

s(v) is the unnormalized v's relevance score, which is being normalized.

S is unnormalized relevance scores of all non-leaf nodes 321-324.

3.3 Grouping

As shown in FIG. 2, parse tree 200 has approximately a hundred nodes, but automatically generated online analytic processing (OLAP) queries typically have approximately a thousand nodes. Only a small fraction of those nodes significantly contribute to an anomaly. Computer resources for generating an explanation (and mental resources for understanding the explanation) are conserved by simplifying a parse tree by pruning of irrelevant nodes and combining relevant but semantically redundant nodes as discussed herein.

Tree simplification herein may topologically modify a parse tree, may annotate tree nodes (e.g. mark as pruned), may modify a copy of the parse tree, or may generate a simplified tree while analyzing the original tree. In other words, tree simplification need not be destructive or lossy, and all of the information in the original tree may be retained in its original form for further analysis after tree simplification. Simplification may occur in phases as discussed later herein, and each phase may generate its own version of the tree or may add or alter annotations of the original tree. Some or all tree versions or node annotations may simultaneously be available for analysis when generating an explanation.

As explained earlier herein, a child node is directly connected to its parent node by a link. All links in parse tree 310 are directed from respective parent node to respective child node, which is why parse tree 310 is an example of a directed acyclic graph (DAG). Herein, a tree path is a path that traverses links in the direction of the links, which means that a tree path should only descend downwards through the levels of the tree. Herein, a tree path may start at any node, even if the node is not the root node (i.e. non-leaf node 321) of parse tree 310. Herein, a tree path may end at a node that is a leaf node or a non-leaf node. Herein, a tree path contains at most one node in a level of parse tree 310. The level of a node is identified by the length (i.e. count of links) from the root node to that node. In one example, a tree path has only one link, such as the link between non-leaf nodes 323-324. Multiple tree paths may or may not overlap. A longer tree path may contain shorter tree path(s).

As explained earlier herein, each of non-leaf nodes 321-324 corresponds to a respective nonterminal symbol and a respective class of the nonterminal symbol. Herein, a group contains one or more tree paths that start at a same non-leaf node and that contain only non-leaf nodes of a same class. A tree path in a group ends at a non-leaf node that is a parent node whose child nodes all are leaf nodes or are non-leaf nodes of a class(es) that are not the class of that parent node.

In other words, a group should maximally cover a connected set of non-leaf nodes of a same class. For example, non-leaf nodes 321-322 should have different respective classes because non-leaf nodes 321-322 are in different respective groups 341-342. However, groups 342-343 may or may not have a same class because groups 342-343 are not directly connected to each other.

Each group corresponds to a portion of statement 360. For example as shown with a dotted line, group 342 corresponds to portion 371. Although not shown, a larger portion may contain a smaller portion. In another example, portion 373 could be nested within portion 372.

A group is relevant if it contains at least one relevant non-leaf node whose relevance score exceeds a predefined relevance threshold. A group may contain a mix of relevant and irrelevant non-leaf nodes. Relevant subset 350 is the set of all relevant groups in parse tree 310.

Parse tree 200 in FIG. 2 contains the following groups of non-leaf nodes listed in Table 2 below.

| Group | Non-leaf nodes |
| --- | --- |
| SG1 | S1-S8 |
| CG1 | C1 |
| CG2 | C2 |
| CG3 | C3-C4 |
| CG4 | C5-C7 |
| DG1 | D1-D22 |
| DG2 | D23-D30 |
| DG3 | D31-D38 |
| DG4 | D39-D46 |
| DG5 | D47-D54 |
| EG1 | E1-E17 |
| EG2 | E18-E23 |
| OG1 | O1 |
| XG1 | X1 |

4.0 Example Simplifiedast (SAST)

Figure 4:
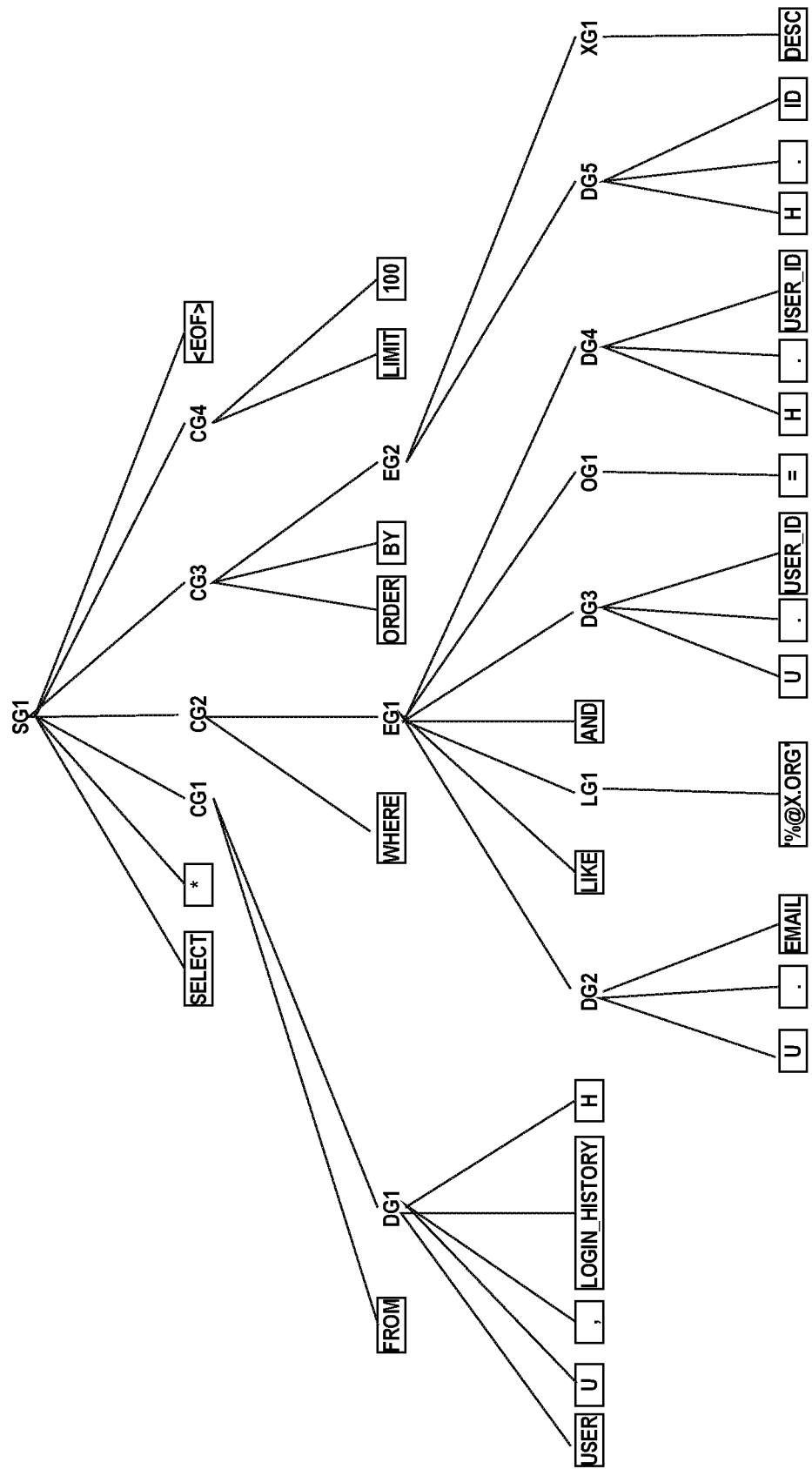
FIG. 4 is a block diagram that depicts an example simplified abstract syntax tree (SAST) that a computer may generate and analyze.

FIG. 4 is a block diagram that depicts an example simplified AST (SAST) 400 that computer 300 may generate and analyze, in an embodiment. FIG. 4 is discussed with reference to FIG. 2.

SAST 400 is generated from parse tree 200 by replacing each group of non-leaf nodes with a respective one distinct group node. In an embodiment, the shallowest non-leaf node in a group is reused as the group node, where the shallowest node in a set of nodes is the node that is the least distant from the root of the tree. For example, non-leaf nodes D23-D30 are replaced with group node DG2 as shown, and non-leaf node D23 may be reused as group node DG2. SAST 400 also contains leaf nodes.

5.0 Two Example Group Graphs

Figure 5:
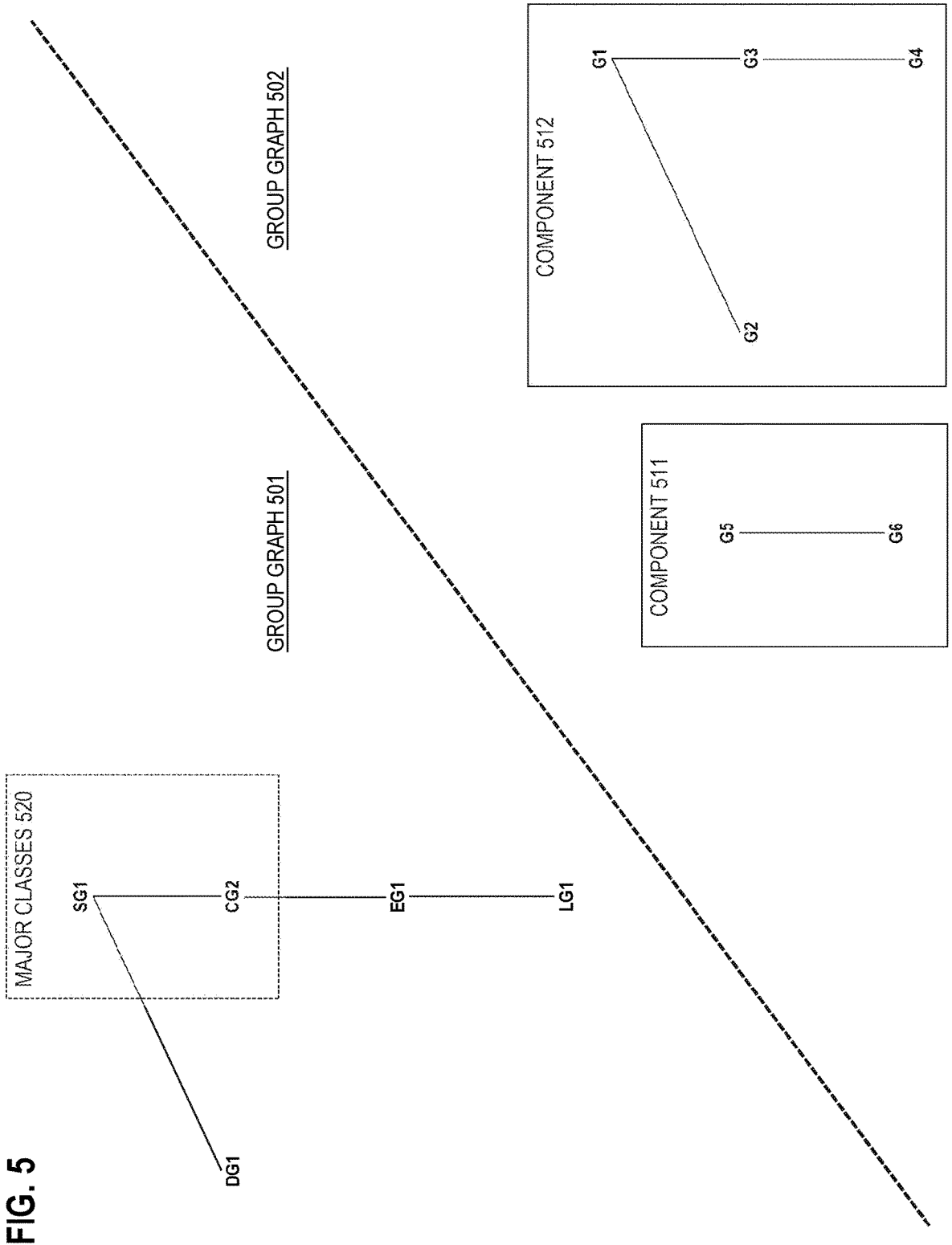
FIG. 5 is a block diagram that depicts two example group graphs that a computer may generate and analyze.

FIG. 5 is a block diagram that depicts two example group graphs 501-502 that computer 300 may generate and analyze, in an embodiment. FIG. 5 is discussed with reference to FIGS. 3-4.

Group graph 501 is generated from SAST 400 by removing leaf nodes and irrelevant group nodes (e.g. groups not in relevant subset 350).

An irrelevant group node may be the parent node of multiple relevant group nodes, in which case, removal of the irrelevant group node causes generation of multiple disconnected components. For example, group graph 502 contains components 511-512. Each component is a respective simplified tree that contains only one or more relevant group nodes. A relevant group node is in exactly one component. Group graph 501 contains only one component.

Each component has a respective distinct root node that may or may not be the root node of the SAST from which the component was generated. A respective explanation is generated based on each child node of the root node of each component. For example, the root node of component 512 is group node G1 that has group nodes G2-G3 as child nodes. Likewise, the root node of component 511 is group node G5 that has group node G6 as a child node. Thus, three explanations are generated from group graph 502, respectively for group nodes G2-G3 and G6. Explanation generation is discussed later herein.

As explained earlier herein, each group has a respective class. Herein, classes are divided (e.g. intuitively by a computer scientist) into two categories, which are major classes and minor classes. In above Table 1, statement and clause are major classes, and the minor classes are catalog object, expression, operator, and other. In group graph 501, group nodes SG1 and CG2 have major classes and are shown in major classes 520, and group nodes DG1, EG1, and LG1 have minor classes.

In various embodiments, class categories do or do not correspond to subsets of tree levels in a component of a group graph. For example, group nodes CG2 and DG1 occur in a same level but have different respective class categories. Thus, category terminology such as high-level and low-level are not used herein. Explanation generation based on class categories and components is discussed later herein.

6.0 Example Typographic Formulae

Figure 6:
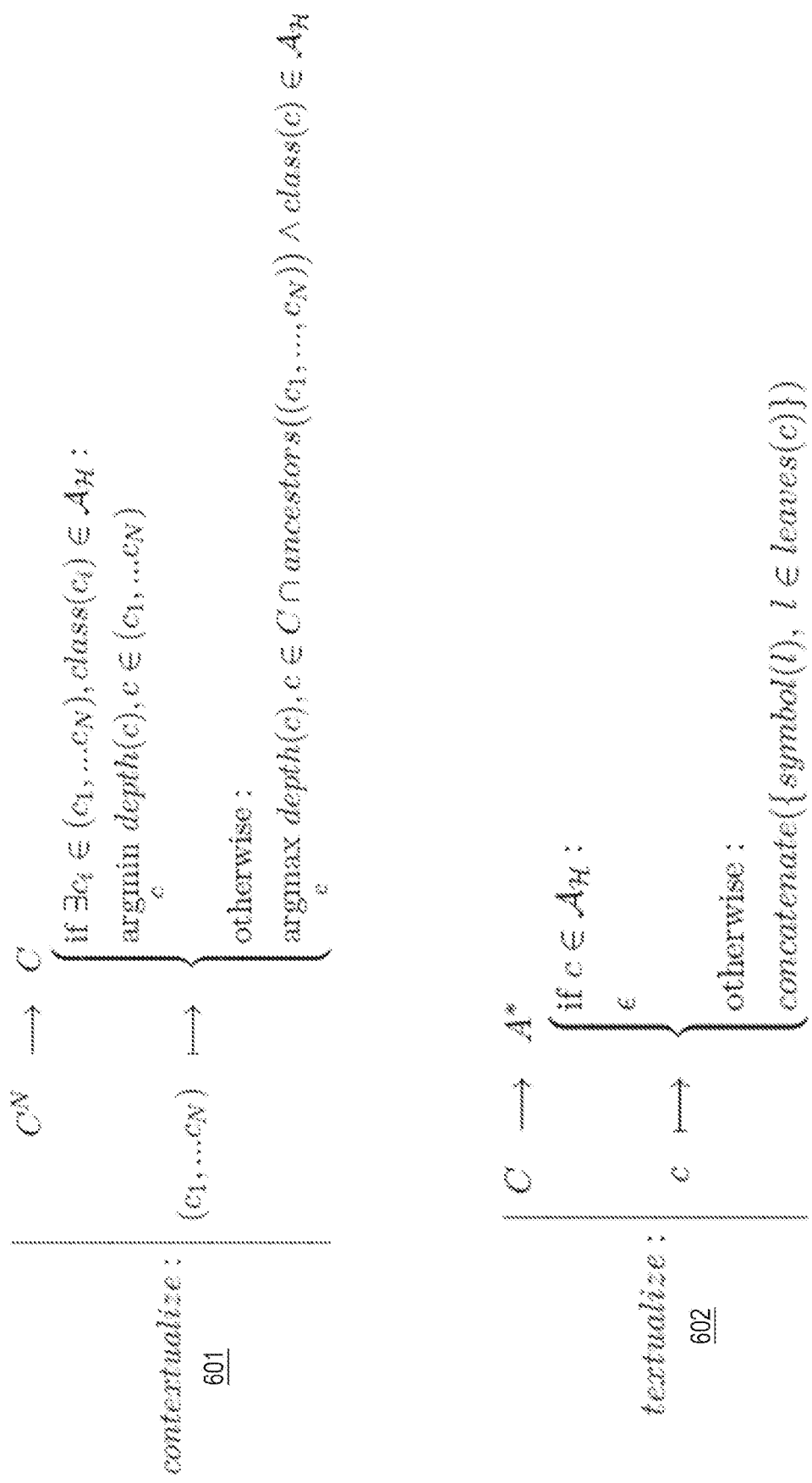
FIG. 6 depicts example typographic formulae 601-602 that a computer may apply to generate natural language explanations.

FIG. 6 depicts example typographic formulae 601-602 that computer 300 may apply to generate natural language explanations, in an embodiment. FIG. 6 is discussed with reference to FIGS. 4-5.

Each explanation is a natural language sentence that may be generated from a template that contains predefined (i.e. constant) text and two placeholders for variable text content. A context and a textualization are the two variable contents that are respectively generated by applying typographic formulae 601-602 for each explanation.

As explained earlier herein, a respective explanation is generated for each child node of a root node of a component of a group graph that contains only group nodes. Each of those child nodes is referred to as a branch node. Typographic formulae 601-602 are applied to the branch node of an explanation. However, typographic formulae 601-602 may also access trees 200, 400, and 501 to inspect: a) the parent node of the branch node in group graph 501, the group and class of the branch node, b) the one or more non-leaf nodes in the group in parse tree 200, and c) the one or more leaf nodes that have ancestor nodes in the group in SAST 400. An ancestor node of a descendant node is any node (except the descendant node itself) in a tree path that starts at the root node of the tree and ends at the descendant node. The root node of a tree has no ancestor nodes. A descendant node may have one or more ancestor nodes. Zero or more of the ancestor nodes may be in the same group as the descendant node.

An embodiment may implement or conform to any of the following definitions.

A component of a DAG is a connected subgraph that is not part of any other connected subgraph.
  The root of a DAG is the node which does not have any incoming edges.
  The length of a path p is a count of nodes contained within p.
  The depth of a node v in a DAG is the length of the shortest path going from the root to v, where root and v are nodes in a same component.
  A node v2 is a child of a node v1 if there exists an edge outgoing from v1 to v2.
  Distinguished in DAGs are two categories of nodes: leaf and non-leaf nodes. A node that does not have any child nodes (i.e. does not have any outgoing edge) is a leaf. Conversely, a node that has at least one child node is not a leaf.
  The descendant of a node vi is any node vj for which at least one path directed from vi to vj exists.
  The ancestor of a node vi as any node vj for which at least one path directed from vj to vi exists.
  A branch of a DAG (with a single component) is any path going from the root of the DAG to one of the leaf nodes.
  Two nodes v1 and v2 are adjacent when linked with an edge in a tree.

In the following discussion, the shallowest node in a set of nodes is the node that is the least distant from the root of the tree. Conversely, the deepest node in a set of nodes is the node that is the most distant from the root of the tree. The following terms have the following meanings in contextualize 601 with an argument that is a particular branch node in the component in group graph 501.

C is the group nodes in SAST 400. C may contain relevant group nodes (in group graph 501) and irrelevant group nodes (not in group graph 501).
  $C^N$ is group nodes in C that are in any tree path of length N in SAST 400 that starts at the branch node. Thus, $C^N$ also defines a set of tree paths (i.e. branches). $C^N$ may or may not contain multiple group nodes in a same tree level in SAST 400. For example when group node CG2 is the branch node, then $C^N$ contains group nodes CG2, EG1, DG2-DG4, LG1, and OG1, most of which are in the same tree level of SAST 400.
  $c_i$ is the i-th group node in $C^N$.
  class( ) is the class, which is the same for a group node, the group of the group node, and all non-leaf nodes in the group.
  ^ is conjunction.
  $A_H$ is the category of major classes.
  depth( ) is the distance (i.e. tree level) of a group node from the root node of the component.

If a current branch contains a group node whose class is major, then argmin depth( ) is the shallowest group node in the branch whose class is major.
  If the branch does not contain a group node whose class is major, then argmax depth( ) is the deepest ancestor of the branch node whose class is in the major category.

For example if DG1 is the branch node, then contextualize 601 evaluates to SG1, which is the context of the explanation. If the branch node instead is CG2, then contextualize 601 evaluates to CG2 as the context of the explanation. In other words, the context of the explanation depends on which branch node is explained.

The following terms have the following meanings in textualize 602 with an argument that is a particular group node in group graph 501.

* is the Kleene star.
  A* is any combination of terminal and/or nonterminal symbols.
  c is the particular group node.
  ϵ is an empty string.
  leaves( ) is leaf nodes that have c as an ancestor.
  symbol( ) is the terminal symbol of a leaf node.

For example for group node EG1, textualize evaluates to "U.EMAIL LIKE '%@X.org' AND U.USER ID=H.USER ID". For group node CG2 whose class is major, textualize evaluates to an empty string.

6.1 Example General Explanation Template

As discussed earlier herein, a natural language explanation may be generated as a natural language sentence from a natural language template that has placeholders for variables. An example template is, "The code snippet contains a contextualize ($c_1$, $c_2$, . . . , $c_N$) with a class ($c_1$) textualize ($c_1$) . . . containing a class ($c_N$) textualize ($c_N$) which has a significant influence on the output of the machine learning algorithm."

The placeholders are shown in bold in the above template. The placeholders and their arguments have meanings presented earlier herein. The ellipsis in the above template means iteration from $c_1$ to $c_N$ and concatenating an additional "containing a" as a separator (not a delimiter) between iterations.

For example, applying the template to branch node CG2 generates an explanation that is, "The code snippet contains a statement with a clause containing a expression U.EMAIL LIKE '%@ X.org' AND U.USER ID=H.USER ID which has a significant influence on the output of the machine learning algorithm."

Likewise, applying the template to branch node DG1 generates an explanation that is, "The code snippet contains a statement with a clause containing a catalog object USER U, LOGIN HISTORY H which has a significant influence on the output of the machine learning algorithm."

Those respective explanations for branch nodes DG1 and CG2 may be presented together as a compound explanation, based on group graph 501, of a SQL statement. Respective (e.g. compound) explanations of components 511-512 may be presented together as a compound explanation, based on group graph 502, of another SQL statement.

That is, explanations of multiple branch nodes may be combined into a compound explanation of a component. Likewise, (e.g. compound) explanations of multiple components may be combined into a compound explanation of a statement. In that way, a concise yet thorough explanation of any statement, no matter how complex, may be generated.

6.2 Example Specialized Templates

Some boundary cases may have abridged or otherwise specialized templates. For example if a current branch of $C^N$ contains the group node returned by contextualize( ) then the group node's class is excluded from the ellipsis iteration discussed above for the explanation of the branch. If textualize( ) returns the same string for two group nodes in the branch, then that string is included only once in the explanation of the branch. However in that case, neither class( ) of both group nodes is excluded.

Respective sets of group nodes of different branches are disjoint (i.e. nonoverlapping), which means that different branches may or may not use different respective templates.

7.0 Example Explanation Process

Figure 7:
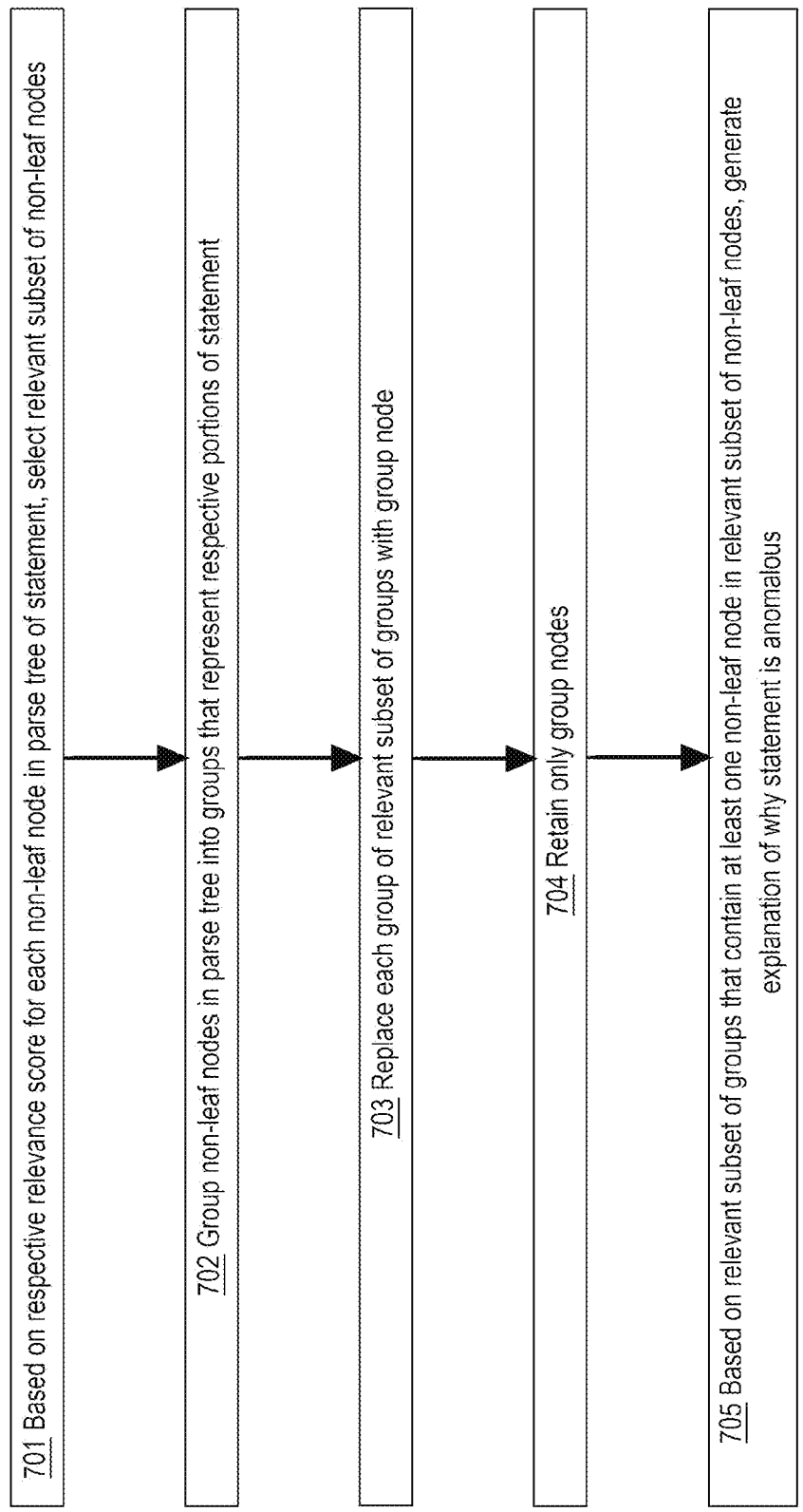
FIG. 7 is a flow diagram that depicts an example computer process that uses MLX and analysis of a parse tree to generate a natural language explanation of why a statement is anomalous.

FIG. 7 is a flow diagram that depicts an example process that computer 300 performs machine learning (ML) explainability (MLX) and analysis of parse tree 310 (or 100 or 200) to generate a natural language explanation of why statement 360 is anomalous in an embodiment. FIG. 7 is discussed with reference to FIG. 3.

Based on a respective relevance score for each non-leaf node in parse tree 310 of statement 360, step 701 selects a relevant subset of non-leaf nodes as discussed earlier herein. In an embodiment, selection by step 701 uses a relevance score threshold to distinguish a relevant node from an irrelevant node.

In an embodiment, steps 702-704 collaborate to generate a simplified AST (SAST) and a group graph. Step 702 groups non-leaf nodes 321-324 in parse tree 310 into groups 341-343 that represent respective portions 371-373 of statement 360 as discussed earlier herein. In an embodiment, grouping by step 702 is based on classes as discussed earlier herein.

Step 703 replaces each group of relevant subset 350 of groups with a respective group node as discussed earlier herein. In an embodiment, step 703 operates in two stages. First, step 703 generates an SAST from parse tree 310. Second, step 703 removes irrelevant group nodes, which may cause disconnection of components as discussed earlier herein.

Step 704 retains only group nodes as discussed earlier herein. Leaf nodes are removed. Step 704 generates a group graph.

Based on relevant subset 350 of groups that contain at least one non-leaf node in the relevant subset of non-leaf nodes, step 705 generates an explanation of why statement 360 is anomalous as discussed earlier herein. In an embodiment, a natural language explanation contains a natural language sentence that is generated from a natural language template.

8.0 Example Explanation Activities

Figure 8:
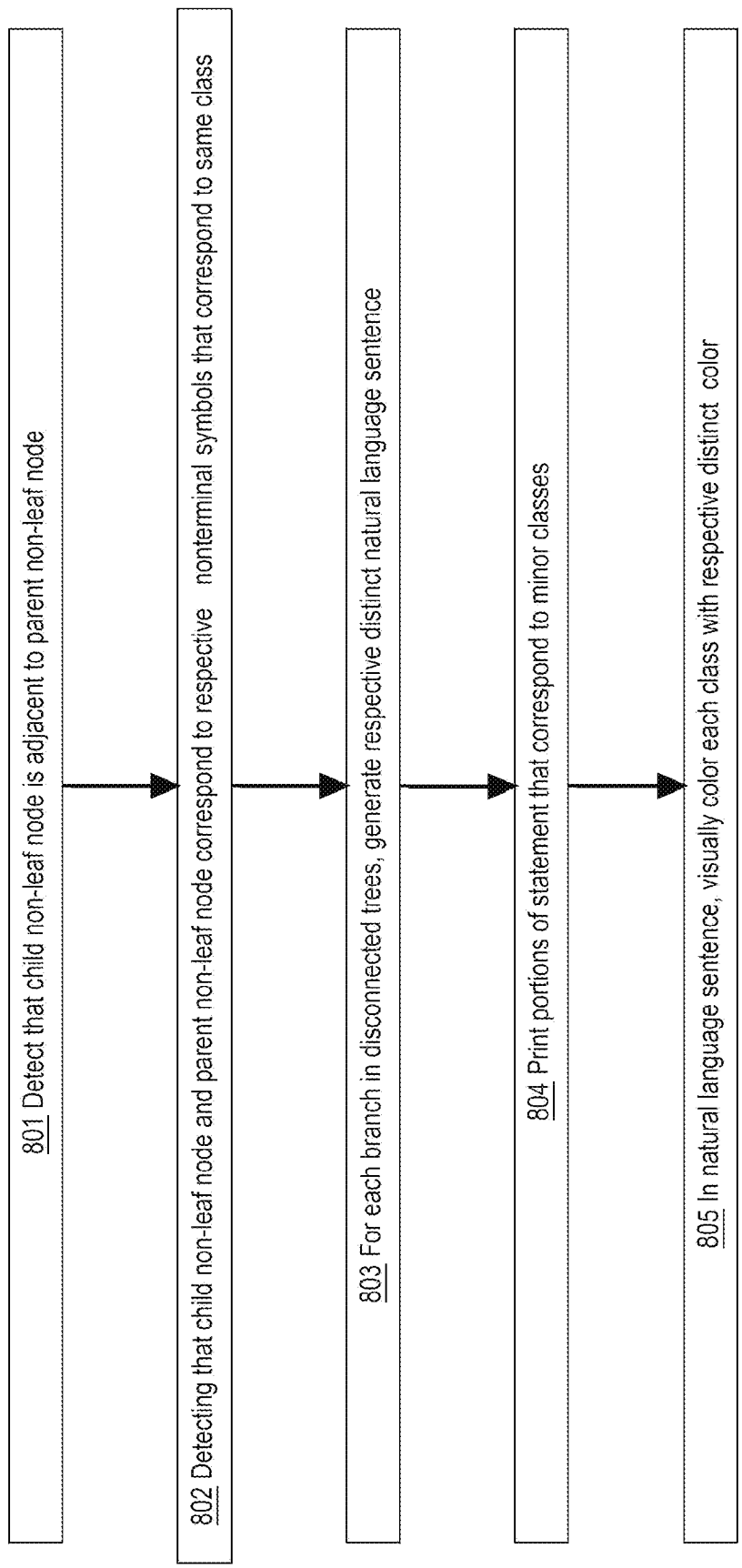
FIG. 8 is a flow diagram that depicts an example computer process that uses MLX and analysis of a parse tree to generate a natural language explanation of why a statement is anomalous.

FIG. 8 is a flow diagram that depicts an example process that computer 300 performs for machine learning (ML) explainability (MLX) and analysis of parse tree 310 (or 100 or 200) to generate a natural language explanation of why statement 360 is anomalous in an embodiment. FIG. 8 is discussed with reference to FIG. 3.

In an embodiment, the process of FIG. 8 processes parse tree 310, a simplified AST (SAST), and a group graph. Steps 801-802 cooperate to perform grouping of non-leaf nodes.

Step 801 detects that child non-leaf node 324 is adjacent to parent non-leaf node 323 in parse tree 310, which means that non-leaf nodes 323-324 are connected and in adjacent levels of parse tree 310.

Step 802 detects that adjacent non-leaf nodes 323-324 correspond to respective nonterminal symbols that correspond to a same class as discussed earlier herein.

Between steps 802-803, parse tree 310 is converted into a group graph that contains multiple disconnected trees as components. For each branch in each disconnected tree, step 803 generates exactly one respective distinct natural language sentence as discussed earlier herein.

Step 804 may be a sub-step of step 803. Step 804 prints some or all of respective portions 371-373 of statement 360 that correspond to minor classes. In an embodiment, step 804 invokes textualize( ) to print a portion into an explanation sentence.

In the natural language sentence, step 805 visually colors each class with respective distinct color. For example, the string returned by an invocation of textualize( ) may have a distinct color in the explanation.

9.0 Cooperating Example Pseudocodes

The following example pseudocodes 1-7 cooperate in an embodiment.

9.1 Example Pseudocode 1

The following example pseudocode 1 selects relevant nonterminal symbols for an explanation. Input includes the following arguments.

node_relevances: a dictionary that associates a relevance score to each non-leaf node in a graph (i.e. parse tree).

$T_{text}$: a relevance score threshold in range [0,1] above which non-leaf nodes are considered to be relevant.

Output includes relevant_nodes as a list.

```
1
2  /* Returns the nonterminal symbols in an AST that are relevant to the
   textual explanation */
3
4  // Initialize the set of relevant_nodes to be returned
5  relevant_nodes   set ( )
6
7  // Min-max normalization of the node scores
8  min_max_node_relevances   min_max_norm(node_relevances)
9
10 // Collect all the nodes that have a normalized score greater than T_text
11 for node in min_max_node_relevances:keys ( )  do
12
13 // Add in relevant_nodes the nodes that have a normalized score
   greater than T_text
14 if min_max_node_relevances:get (node)   >   T_text then
15 relevant_nodes:add (node)
16
17 end for
18
19 Function min_max_norm(node_relevances):
20 /* Performs a min_max_normalization on the node scores
   (cf. Eq. 1) */
21 /* Returns a dictionary associating to each node its normalized
   relevance score */
22
23 // Initialize the dictionary to be returned
24 min_max_node_relevances   Hashmap ( )
25
```

-continued

```
26 // Perform the normalization on each node score and update
min_max_node_relevances
27 for node in node_relevances:keys ( ) do
28
29 // Perform the normalization on each node score and update
min_max_node_relevances
30 max score   max (node_relevances:values ( ) )
31 min score   min (node_relevances:values ( ) )
32 normalized_node_score   (node_relevances:get (node) ☐ min) =
(max ☐ min)
33 min_max_node_relevances:set (node; normalized_node_score)
34
35 end for
36
37 return min_max_node_relevances
```

9.2 Example Pseudocode 2

The following example pseudocode 2 clusters nonterminal symbols into syntactic groups. Input includes ast that is an AST. Output includes sast that is an SAST.

```
1
2 /* Returns the SAST given the AST, and a dictionary providing
information concerning the clusters in the
SAST. The dictionary should give each cluster's nodes, leaves, and
class. */
3
4 // Initialize unexplored nodes to the set of non-leaf nodes in the AST
5 unexplored nodes   get non leaf nodes (ast)
6
7 // Initialize nodes to explore to the root node
8 nodes to explore   set ( )
9 nodes to explore:add (get root (ast) )
10
11 // Initialize the dictionary storing information regarding clusters in the
SAST
12 clusters info   Hashmap ( )
13
14 // Initialize the dictionary counting the indexing for each abstract class
15 class counter   Hashmap ( )
16 cluster class   class (get root (ast) )
17 class counter   class counter updater (class counter; cluster class)
18
19 // Initialize dictionary storing the parent cluster name for each node
20 node parent cluster   Hashmap ( )
21
22 // Initialize the SAST with the syntactic group of the AST's root node
23 sast   Dag ( )
24 cluster name   cluster class + class counter:get (cluster class)
25 sast:add node (cluster name)
26
27 // Get the set of non-leaf nodes in the AST
28 unexplored nodes   get non leaf nodes (ast)
29
30 // Explore all the nodes in the AST, from the root to the leaves
31 while length (nodes to explore)  != 0 do
32
33 // Sample a node from the nodes to be explored
34 node   sample (ast)
35
36 // Get the cluster (set of nodes) to which node belongs
37 node cluster   get adjacent nodes of same class (source node;
unexplored nodes;  ast)
38
39 // Update unexplored nodes, by removing the nodes that have been
clustered with node
40 unexplored nodes:remove (node cluster)
41
42 // If the sampled node is not the root node (because we have already
initialized the below objects with the root node)
43 if node != get root (ast) then
44 cluster class   class (node)
45 class counter   class counter updater (class counter; cluster class)
46 cluster name   cluster class + class counter:get (cluster class)
47 sast:add edge (node parent cluster:get (node); cluster name)
48
49 // Update nodes to explore
50 nodes to explore:remove (node)
51 cluster s nodes = get cluster successors (node cluster)
52 for s node in cluster s nodes do
53 node parent cluster:set (s node; cluster name)
54 if s node in unexplored nodes then
55 nodes to explore.add (s node)
56 end for
57
58 // Update clusters info
59 cluster info   Hashmap ( )
60 cluster info:set (0nodes0; node cluster)
61 cluster info:set (0class0; cluster class)
62 clusters info:set (cluster name; cluster info)
63
64 end while
65
66 return sast; clusters info
```

9.3 Example Pseudocode 3

The following example pseudocode 3 prunes irrelevant syntactic groups (e.g. groups or group nodes). Input includes the following arguments.

sast: the SAST.

relevant_nodes: the nodes that are considered to be relevant to the explanation.

clusters_info: the dictionary storing information regarding each clusters in the SAST.

Output includes grsg as a graph of relevant syntactic groups (i.e. a group graph).

```
1
2 /* Given the SAST, keeps only the relevant syntactic groups
(i.e. clusters) and returns the GRSG */
3
4 // Initialize the GRSG
5 grsg   Dag ( )
6
7 // Get the SAST without the leaves
8 sast no leaves   remove leaves (sast)
9
10 // Start the building process of the GRSG at the root node of the
SAST
11 root cluster   get root (sast without leaves)
12 grsg   build grsg (grsg; root cluster; root cluster; sast without leaves;
relevant nodes; clusters info)
13
14 return grsg
15
16 Function build grsg (grsg; caller cluster; called cluster; sast without
leaves; relevant nodes; clusters info) :
17 /* Builds the GRSG recursively, by going through the clusters in
the SAST in a depth-first fashion */
18
19 // Check if the called cluster is relevant
20 if is relevant (called cluster; relevant nodes; clusters info) then
21
22 // Case root cluster
23 if caller cluster  == called cluster then
24 grsg:add node (caller cluster)
25 else
26 grsg: add edge (caller cluster; called cluster)
27 caller cluster = called cluster
28
29 // End of recursion when the called cluster doesn't have any children
cluster
30 if length (successors (sast without leaves; called cluster) ) == 0 then
31 return grsg
32
33 // Depth-first lookup
```

```
34 for successor cluster in successors (sast without leaves; called cluster)
do
35
36 // Build the GRSG
37 grsg   create grsg (grsg; caller cluster; called cluster; sast without
leaves; relevant nodes; clusters info)
38 end for
```

9.4 Example Pseudocode 4

The following example pseudocode 4 provides textual explanation generation. Input includes the following arguments.

sast: an SAST.
$A_H$: major classes.
$A_L$: minor classes.
clusters_info: a dictionary storing information regarding each cluster in sast.

```
1  /* Given the GRSG, generates a textual explanation */
2
3  // Get all the branches of the GRSG
4  branches   get branches (grsg)
5
6  // Initialize the textual explanation with the empty string
7  text explanation      ''
8
9  // For each branch, print a sentence.
10 for branch in branches do
11
12 // Initialize the sentence to be produced for the branch
13 sentence   'The code snippet contains a '
14
15 // Get contextualize (branch)
16 context   contextualize (branch;  sast;AH;AL)
17 sentence   sentence + context
18
19 // If context is in branch, remove context from branch (cf. Section 6.2.2)
20 if context in branch then
21 branch:remove (context)
22
23 // Iterate over the nodes in the branch, from the shallowest to the deepest
24 for cluster in branch do
25
26 // Get class (cluster)
27 class   class (cluster)
28
29 // Get textualize (cluster)
30 cluster text   textualize (cluster)
31
32 // Append the information in the sentence
33 sentence   sentence + ' with a' + class + cluster text
34
35 end for
36
37 // Append the sentence in the textual explanation
38 text explanation   sentence + ' which has a signi_cant inuence on the output of the ML algorithm. '
39
40 end for
41
42 return text explanation
43
44 Function contextualize (branch, sast, AH, AL) :
45 /* Given a branch, outputs a cluster contextualizing the branch  (cf. Eq. 6.2) */
46
47 // Get the branch's clusters from AH
48 branch higher class   get higher class (branch;AH)
49
50 // If the branch contains at least one cluster from AH, return the shallowest cluster
51 if length (branch higher class)   >   0 then
52 return branch higher class [0]
53
54 // Else, return the deepest common ancestor of the clusters from the branch in the SAST belonging to AH
55 else
56 // The ancestors of the first cluster in the branch is the common ancestors of all clusters in the branch
57 common ancestors gets ancestors (sast;  branch [ 0 ] )
58
59 // Get the deepest common ancestor which belongs to AH
60 for ances in reverse (common ancestors) do
61 if class (ances) in AH then
62 return ances
63 end for
```

9.5 Example Pseudocode 5

The following example pseudocode 5 provides first helper functions.

```
1  Function Hashmap ( ) :
2  /* Constructor that returns an empty hashmap (i.e. dictionary) */
3
4  Function Dag ( ) :
5  /* Constructor that returns an empty Directed Acyclic Graph (DAG) */
6
7  Function class (node) :
8  /* Returns the abstract class of a given node */
9  /* As described in Section 6.3, this mapping should be engineered to the use-case */
10
11 Function get root (dag) :
12 /*   Returns the root node of a DAG */
13
14 Function get non leaf nodes (dag) :
15 /*   Returns the set of non-leaf nodes given a DAG */
16
17 Function get leaf nodes (dag) :
18 /* Returns the set of leaf nodes given a DAG */
19
20 Function sample (set) :
21 /* Sample an element from a set */
22
```

```
23 Function successors (dag; node) :
24 /* Given a DAG and a node, returns the successors of the node in the DAG
*/
25
26 Function predecessors (dag; node) :
27 /* Given a DAG and a node, returns the predecessors of the node in the DAG
*/
28
29 Function ancestors (dag; node) :
30 /* Given a DAG and a node, returns the ancestors of the node in the DAG */
31 /* The output is an ordered list of the ancestors, where a node at index i
is an ancestor of a node at
index j if i < j */
32
33 Function descendants (dag; node) :
34 /* Given a DAG and a node, returns the set of descendants of the node in
the DAG */
35
36 Function remove leaves (dag) :
37 /* Given a DAG, remove the leaves and returns the DAG without leaves */
38 /* Practically speaking, this function removes all the nodes that do not
have any children in the DAG */
39
40 Function depth (dag; node) :
41 /* Given a DAG and a node, outputs the depth of a node in that DAG */
42
43 Function get higher class (branch;AH) :
44 /* Given a branch (ordered list clusters), outputs the clusters that
belong to AH */
45 /* The output is an ordered list of clusters, where a cluster at index i
is the ancestor of a cluster at
index j if i < j */
46
47 Function reverse (list) :
48 /* Given a list, returns the reversed list */
49
50 Function intersection (set1; set2) :
51 /* Given two sets set1 and set2, returns their intersection */
52
53 Function concatenate (string list) :
54 /* Given a list of strings, returns their concatenation */
```

9.6 Example Pseudocode 6

The following example pseudocode 6 provides second helper functions.

```
1 Function get adj predecessors of same class (source node; unexplored
nodes; ast) :
2 /* Given a node in the AST, collects all the predecessors that belong to
the same syntactic group */
3 /* Returns a set of the predecessors belonging to the same syntactic
group as the source node */
4
5 // Initialize the set to be returned
6 node predecessors      set ( )
7
8 // Look for adjacent predecessors of the same class
9 for p in predecessors (ast; source node)   do
10
11 // If a predecessor is not explored & belongs to the same class as the
source node, add in the set
12 if (p in unexplored nodes) and (class (source node) == class
(p) ) then
13 node predecessors : add (s)
14
15 // Recursively look for the predecessors's predecessors belonging to
the
same syntactic group
16 get adj predecessors of same class (p; unexplored nodes; ast)
17
18 end for
19
20 return node predecessors
21
22 Function get adj successors of same class (source node; unexplored
nodes; ast) :
23 /* Given a node in the AST, collects all the successors that belong to
the same syntactic group */
24 /* Returns a set of the successors belonging to the same syntactic
group as the source node */
25
26 // Initialize the set to be returned
27 node successors      set ( )
28
29 // Look for adjacent successors of the same class
30 for s in successors (ast; source node) do
31
32 // If a successor is not explored & belongs to the same class as the
source node, add in the set
33 if (s in unexplored nodes) and (class (source node) == class (s) ) then
34 node successors:add (s )
35
36 // Recursively look for the successor's successors belonging to the
same syntactic group
37 get adj successors of same class (s; unexplored nodes; ast)
38
39 end for
40
41 return node successors
42
43 Function get adjacent nodes of same class (source node; unexplored
nodes; ast) :
44 /* Given a node in the AST, collects all the nodes that belong to the
same syntactic group */
45 /* Returns a set of the nodes belonging to the same syntactic group
as the source node */
46
```

```
47 // Initialize the set to be returned
48 node syntactic group    set ( )
49
50 // Get all adjacent successors of the same syntactic group
51 node successors
get adj successors of same class (source node; unexplored
nodes; ast)
52 node syntactic group    node syntactic group:union (node successors)
53
54 // Get all adjacent predecessors of the same syntactic group
55 node predecessors
get adj predecessors of same class (source node;
unexplored nodes; ast)
56 node syntactic group    node syntactic group:union (node
predecessors)
57
58 return node syntactic group
59
60 Function class counter updater (class counter; cluster class) :
61 /* Updates the class counter */
62
63 if cluster class in class counter:keys ( ) then
64   class counter:set (cluster class; class counter:get (cluster class) + 1)
65 else
66   class counter:set (cluster class ; 1)
67
68 return class counter
```

9.7 Example Pseudocode 7

The following example pseudocode 7 provides third helper functions.

```
1 Function get cluster successors (ast; cluster nodes) :
2 /* Returns the successor non-leaf nodes for a given cluster of nodes */
3
4 // Initialize the set of cluster successor (non-leaf) nodes to be returned
5 successor nodes    set ( )
6
7 // Get the non-leaf nodes of the AST
8 non leaf nodes    get non leaf nodes (ast)
9
10 // Iterate over each successors for each node in the cluster, check if it
is a non-leaf node
11 for node in cluster nodes do
12   for s in successors (ast; node) do
13     if s in leaves then
14       successor nodes:add (s)
15   end for
16 end for
17
18 return successor nodes
19
20 Function is relevant (cluster name; relevant nodes; clusters info) :
21 /* Returns a boolean assessing whether the cluster is relevant to the
explanation or not */
22
23 // If there is at least one node in the cluster which is relevant, the
cluster is relevant
24 for node in clusters info:get (cluster name) :get (0nodes0) do
25   if node in relevant nodes then
26     return True
27 end for
28 return False
29
30 Function get cluster leaves (sast; cluster) :
31 /* Returns the ordered list of the child leaves of a given cluster in a
SAST */
32
33 // Get the set of leaves of the SAST
34 leaves    get leaf nodes (sast)
35
36 // Get the set of descendants of the cluster in the SAST
37 descendants    descendants (sast; cluster)
38
39 // Return the intersection of the two sets
40 return intersection (leaves; descendants)
41
42 Function textualize (cluster, sast, AH, AL) :
43 /* Given a cluster, outputs the corresponding code snippet produced
by the cluster in the SAST */
44
45 // If the cluster belongs to AH, return an empty string
46 if cluster in AH then
47   return ''
48
49 // Else, return the concatenation of the child leaves of the cluster in
the SAST
50 else
51   // Get the child leaves of the cluster
52   cluster child leaves    get cluster leaves (sast; cluster)
53
54   // Return the concatenation of the leaves (i.e. tokens in the initial
code snippet)
55   return concatenate (cluster child leaves)
```

6.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

6.1 Metadata Definitions

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces.

A tablespace is a set of one or more files that are used to store the data for various types of database objects, such as a table. If data for a database object is stored in a tablespace, a database dictionary maps a database object to one or more tablespaces that hold the data for the database object. A database dictionary is referred to by a DBMS to determine how to execute database commands submitted to a DBMS. Database commands can access the database objects that are defined by the database dictionary.

6.2 Database Operation

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11 g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

6.3 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
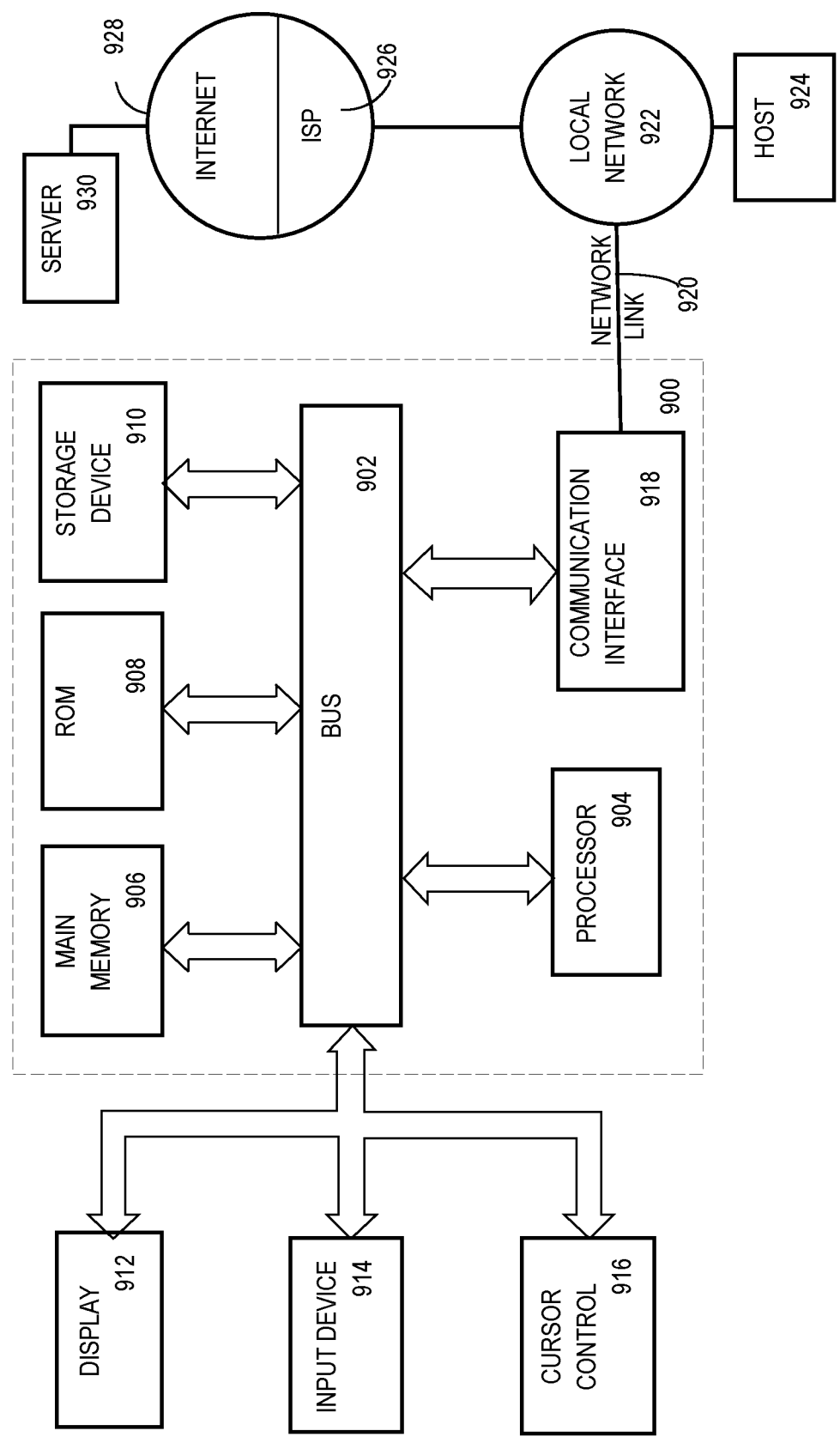
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
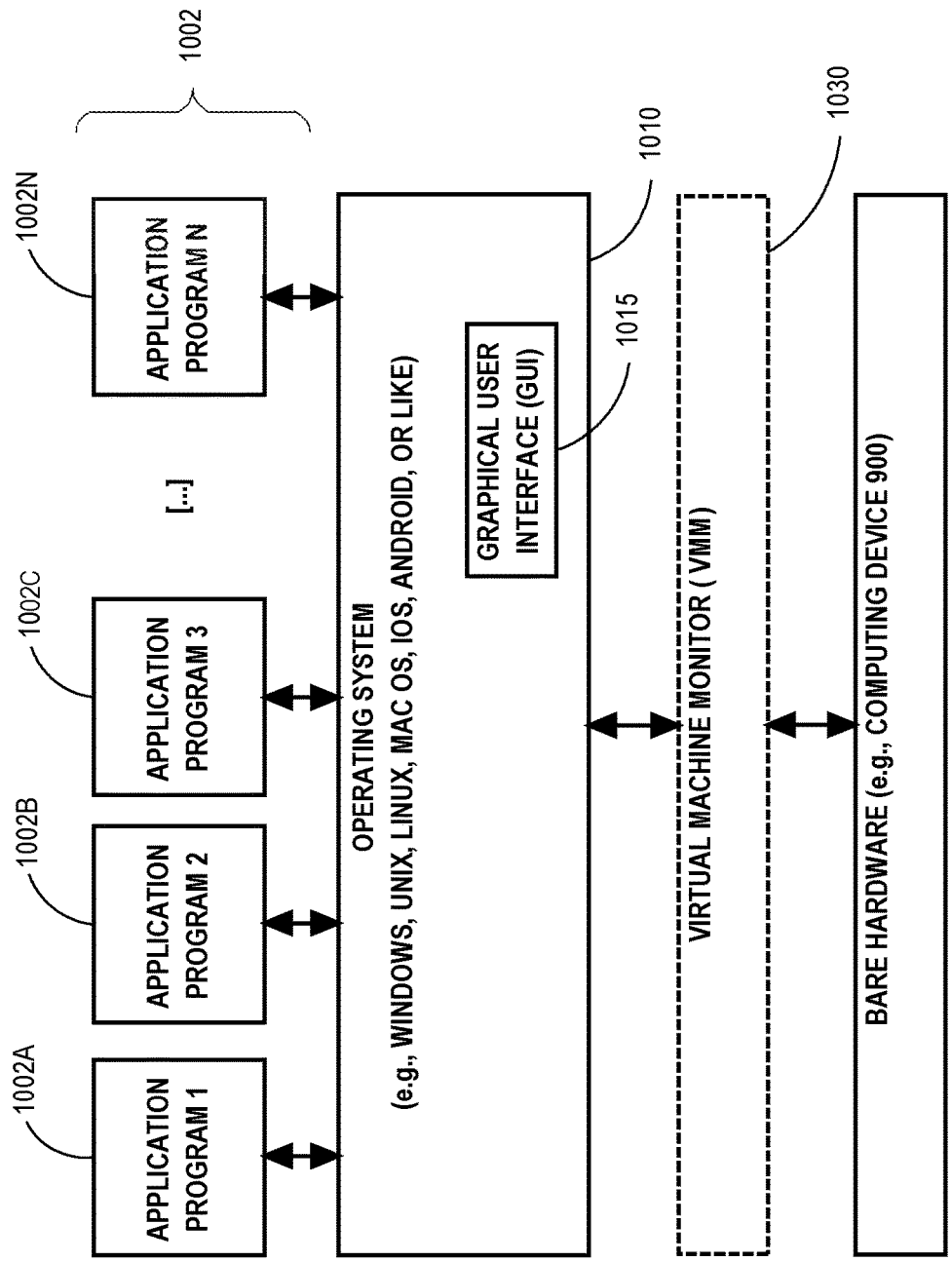
FIG. 10 is a block diagram that illustrates a basic software system that may be employed for controlling the operation of a computing system.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the dataset, such as with feature bootstrap aggregating (bagging). Therefore, the decision trees gain accuracy as the decision trees grow without being forced to over fit training data as would happen if the decision trees were forced to learn all feature dimensions of the dataset. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    selecting, based on a respective relevance score for each non-leaf node in a parse tree of a semantically valid logic statement, a relevant subset of non-leaf nodes;
    grouping non-leaf nodes in the parse tree into a plurality of groups that represent respective portions of the semantically valid logic statement;
    generating, from the parse tree, one or more disconnected trees by:
        replacing each group of a relevant subset of the plurality of groups that contain at least one non-leaf node in the relevant subset of non-leaf nodes with a group node, and
        retaining only the group nodes; and
    generating, based on the one or more disconnected trees, an explanation of why the semantically valid logic statement is anomalous;
    wherein the method is performed by one or more computers.

2. The method of claim 1 wherein:
    a grammar comprises a plurality of distinct nonterminal symbols;
    each non-leaf node in the parse tree corresponds to a respective nonterminal symbol in the plurality of distinct nonterminal symbols;
    each nonterminal symbol in the plurality of distinct nonterminal symbols corresponds to exactly one respective class in a plurality of distinct classes;
    each class in the plurality of distinct classes corresponds to one or more nonterminal symbols in the plurality of distinct nonterminal symbols;
    at least one class in the plurality of distinct classes corresponds to multiple nonterminal symbols in the plurality of distinct nonterminal symbols;
    said grouping the non-leaf nodes in the parse tree is based on the plurality of distinct classes.

3. The method of claim 2 wherein:
    the plurality of distinct classes comprises of one or more major classes and one or more minor classes;
    said generating the explanation comprises printing portions of the semantically valid logic statement that correspond to the one or more minor classes.

4. The method of claim 2 wherein:
    said non-leaf nodes in the parse tree comprise a parent non-leaf node and a child non-leaf node;
    said grouping the non-leaf nodes in the parse tree comprises:
        detecting that the child non-leaf node is adjacent to the parent non-leaf node, and
        detecting that the child non-leaf node and the parent non-leaf node correspond to respective nonterminal symbols that correspond to a same class in the plurality of distinct classes.

5. The method of claim 4 wherein said generating the explanation comprises for each tree in the one or more disconnected trees, generating, for each branch node in the one or more disconnected trees, a respective distinct natural language sentence.

6. The method of claim 5 wherein the natural language sentence of a particular disconnected tree of the one or more disconnected trees identifies exactly three classes of the plurality of distinct classes.

7. The method of claim 6 further comprising visually coloring, in the natural language sentence, each class of the exactly three classes with a respective distinct color.

8. The method of claim 6 wherein:
    the particular disconnected tree contains, at distinct respective depths, three or more group nodes;
    the plurality of distinct classes consists of one or more major classes and one or more minor classes;
    the exactly three classes are:
        a first class of the group node at the least depth of the three or more group nodes,
        a second class of the three or more group nodes that is in the one or more major classes, and
        a third class of the group node at the most depth of the three or more group nodes.

9. The method of claim 8 wherein the natural language sentence identifies the exactly three classes in an ordering that is the first class, the second class, and the third class.

10. The method of claim 8 wherein:
    the exactly three classes correspond to group nodes in a particular path in the particular disconnected tree;
    the particular path contains a particular group node that corresponds to a class that is not one of the exactly three classes;
    the particular group node is selected from a group consisting of:
        a class of the one or more major classes, and
        a class of the one or more minor classes.

11. One or more non-transitory computer-readable media storing instructions that, when executed by one or more processors, cause:
    selecting, based on a respective relevance score for each non-leaf node in a parse tree of a semantically valid logic statement, a relevant subset of non-leaf nodes;
    grouping non-leaf nodes in the parse tree into a plurality of groups that represent respective portions of the semantically valid logic statement;

generating, from the parse tree, one or more disconnected trees by:
    replacing each group of a relevant subset of the plurality of groups that contain at least one non-leaf node in the relevant subset of non-leaf nodes with a group node, and
    retaining only the group nodes; and
generating, based on the one or more disconnected trees, an explanation of why the semantically valid logic statement is anomalous.

12. The one or more non-transitory computer-readable media of claim 11 wherein:
    a grammar comprises a plurality of distinct nonterminal symbols;
    each non-leaf node in the parse tree corresponds to a respective nonterminal symbol in the plurality of distinct nonterminal symbols;
    each nonterminal symbol in the plurality of distinct nonterminal symbols corresponds to exactly one respective class in a plurality of distinct classes;
    each class in the plurality of distinct classes corresponds to one or more nonterminal symbols in the plurality of distinct nonterminal symbols;
    at least one class in the plurality of distinct classes corresponds to multiple nonterminal symbols in the plurality of distinct nonterminal symbols;
    said grouping the non-leaf nodes in the parse tree is based on the plurality of distinct classes.

13. The one or more non-transitory computer-readable media of claim 12 wherein:
    the plurality of distinct classes comprises of one or more major classes and one or more minor classes;
    said generating the explanation comprises printing portions of the semantically valid logic statement that correspond to the one or more minor classes.

14. The one or more non-transitory computer-readable media of claim 12 wherein:
    said non-leaf nodes in the parse tree comprise a parent non-leaf node and a child non-leaf node;
    said grouping the non-leaf nodes in the parse tree comprises:
        detecting that the child non-leaf node is adjacent to the parent non-leaf node, and
        detecting that the child non-leaf node and the parent non-leaf node correspond to respective nonterminal symbols that correspond to a same class in the plurality of distinct classes.

15. The one or more non-transitory computer-readable media of claim 14 wherein said generating the explanation comprises for each tree in the one or more disconnected trees, generating, for each branch node in the one or more disconnected trees, a respective distinct natural language sentence.

16. The one or more non-transitory computer-readable media of claim 15 wherein the natural language sentence of a particular disconnected tree of the one or more disconnected trees identifies exactly three classes of the plurality of distinct classes.

17. The one or more non-transitory computer-readable media of claim 16 wherein:
    the particular disconnected tree contains, at distinct respective depths, three or more group nodes;
    the plurality of distinct classes consists of one or more major classes and one or more minor classes;
    the exactly three classes are:
        a first class of the group node at the least depth of the three or more group nodes,
        a second class of the three or more group nodes that is in the one or more major classes, and
        a third class of the group node at the most depth of the three or more group nodes.

18. The one or more non-transitory computer-readable media of claim 16 wherein the instructions further cause visually coloring, in the natural language sentence, each class of the exactly three classes with a respective distinct color.

\* \* \* \* \*

UNITED STATES PATENT AND TRADEMARK OFFICE
CERTIFICATE OF CORRECTION

PATENT NO. : 12,260,306 B2
APPLICATION NO. : 17/891350
DATED : March 25, 2025
INVENTOR(S) : Kobayashi et al.

It is certified that error appears in the above-identified patent and that said Letters Patent is hereby corrected as shown below:

In the Specification

In Column 1, Line 31, delete "syntacticly" and insert -- syntactically --, therefor.

In Column 6, Line 11, delete "'%@X.org'" and insert -- '%@X.ORG' --, therefor.

In Column 12, Line 25, delete "'%@X.org'" and insert -- '%@X.ORG' --, therefor.

In Column 12, Line 49, delete "'%@X,org'" and insert -- '%@X.ORG' --, therefor.

In Column 13, Line 8, delete "contextualize( )" and insert -- contextualize( ), --, therefor.

In Column 18, Line 13, delete "signi_cant inuence" and insert -- significant influence --, therefor.

In Column 31, Line 20, delete "and or" and insert -- and/or --, therefor.

Signed and Sealed this
Seventeenth Day of June, 2025

Coke Morgan Stewart
*Acting Director of the United States Patent and Trademark Office*